United States Patent
Chang et al.

(10) Patent No.: US 8,848,576 B2
(45) Date of Patent: Sep. 30, 2014

(54) DYNAMIC NODE CONFIGURATION IN DIRECTORY-BASED SYMMETRIC MULTIPROCESSING SYSTEMS

(75) Inventors: Bruce J. Chang, Saratoga, CA (US);
Damien Walker, San Jose, CA (US);
Bruce Petrick, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 270 days.

(21) Appl. No.: 13/559,292

(22) Filed: Jul. 26, 2012

(65) Prior Publication Data
US 2014/0029616 A1    Jan. 30, 2014

(51) Int. Cl.
| H04L 12/28 | (2006.01) |
| H04L 12/54 | (2013.01) |
| H04J 3/16 | (2006.01) |
| G06F 15/177 | (2006.01) |
| G06F 9/26 | (2006.01) |

(52) U.S. Cl.
USPC ...... 370/254; 370/395.31; 370/428; 370/465; 709/220; 711/202

(58) Field of Classification Search
USPC ......... 711/203, 133, 144, 146, 206, 207, 202; 707/102; 370/254, 395, 428, 465; 709/220
See application file for complete search history.

(56) References Cited

U.S. PATENT DOCUMENTS

| 6,918,015 B2 | 7/2005 | Kessler et al. | |
| 2001/0027512 A1* | 10/2001 | Hagersten | 711/202 |
| 2002/0048262 A1* | 4/2002 | Fieremans | 370/254 |
| 2003/0028746 A1* | 2/2003 | Durrant | 711/206 |
| 2003/0204273 A1* | 10/2003 | Dinker et al. | 700/48 |
| 2005/0174953 A1* | 8/2005 | Ho | 370/310 |
| 2005/0240735 A1* | 10/2005 | Shen et al. | 711/144 |
| 2005/0273571 A1* | 12/2005 | Lyon et al. | 711/203 |
| 2006/0271645 A1* | 11/2006 | Theimer et al. | 709/218 |
| 2008/0109585 A1 | 5/2008 | DeMent et al. | |
| 2008/0195820 A1* | 8/2008 | Lais et al. | 711/146 |
| 2008/0270454 A1* | 10/2008 | Davis et al. | 707/102 |
| 2009/0193194 A1 | 7/2009 | Drapala et al. | |
| 2009/0198897 A1* | 8/2009 | Arimilli et al. | 711/122 |
| 2009/0213755 A1* | 8/2009 | Lu | 370/254 |
| 2010/0180084 A1 | 7/2010 | Cypher | |
| 2011/0010716 A1 | 1/2011 | Raghuraman et al. | |
| 2011/0314228 A1 | 12/2011 | Blake et al. | |
| 2012/0008674 A1* | 1/2012 | Yamamoto et al. | 375/240.01 |

* cited by examiner

*Primary Examiner* — Alpus H Hsu
*Assistant Examiner* — Camquyen Thai
(74) *Attorney, Agent, or Firm* — Marsh Fischmann & Breyfogle LLP; Jonathon A. Szumny

(57) ABSTRACT

Systems and methods that allow for dynamically deconfiguring, reconfiguring and/or otherwise configuring nodes (e.g., processors) in a symmetric multiprocessing system (e.g., a symmetric multiprocessor) in a manner that avoids, or at least limits, inefficiencies such as renumbering of node IDs, system reboots, SW configuration handle changes, and the like. In one arrangement, a number of modules, tables and/or the like that are configured to generate node IDs and/or convert node IDs from one form to another form can be intelligently implemented within an SMP to allow the various processes and/or components of an SMP to utilize the node IDs in a more efficient manner. For instance, as SDs in an SMP are often configured to work with CNIDs (e.g., for use in determining at which node a particular requested cache line resides), any node GNIDs that are sent to the SD for processing can first be converted into corresponding CNIDs.

20 Claims, 9 Drawing Sheets

MAPPING TABLE 500'

| NODE | GNID | CNID |
|---|---|---|
| 0 | $GNID_0$ | $CNID_0$ |
| ✕ | $GNID_1$ | ✕ |
| 2 | $GNID_2$ | $CNID_1$ |
| 3 | $GNID_3$ | $CNID_2$ |

FIG. 12b

MAPPING TABLE 500

| NODE | GNID | CNID |
|---|---|---|
| 0 | $GNID_0$ | $CNID_0$ |
| 1 | $GNID_1$ | $CNID_1$ |
| 2 | $GNID_2$ | $CNID_2$ |
| 3 | $GNID_3$ | $CNID_3$ |

FIG. 12a

DYNAMIC NODE CONFIGURATION IN DIRECTORY-BASED SYMMETRIC MULTIPROCESSING SYSTEMS

BACKGROUND

1. Field of the Invention

The present invention generally relates to multi-processor or multi-node coherent systems and, more particularly, to systems and methods that allow for the dynamic configuration (e.g., deconfiguration, reconfiguration, and the like) of one or more nodes of a directory-based, glueless, symmetric multi-processor system in a manner free of necessarily requiring a reboot of the system, changing of software configuration handles that reference input/output (I/O) devices interconnected to the system, and/or the like.

2. Relevant Background

A cache is a component that transparently stores data so that future requests for that data can be served faster. More specifically, a cache is a smaller, faster memory which stores copies of the data from the most frequently used main memory locations. For instance, a central processing unit (CPU) cache is used by one or more CPUs of a computer or computing system to reduce the average time to access memory (e.g., to read executable instructions, read or write data, and the like). When the CPU needs to read from or write to a location in main memory, the CPU (e.g., the processing core) typically first checks whether a copy of the data is in the cache and then proceeds to read/write from/to the cache when the data is in the cache (i.e., when there is a "cache hit"). Otherwise (i.e., in the event of a "cache miss"), the CPU typically proceeds to read/write from/to the main memory (e.g., DRAM) and copies the data or instructions into the cache as a cache line (e.g., including the copied data/instructions and tag or memory location of the data/instructions) for subsequent use.

Oftentimes, a CPU may include and/or have access to a number of independent caches, such as an instruction cache to speed up executable instruction fetch, a data cache to speed up data fetch and store, and a translation lookaside buffer (TLB) used to speed up virtual-to-physical address translation for both executable instructions and data. Also, one or more of the caches may be made up of a hierarchy of cache levels (e.g., L1, L2, L3, and the like), where each successive level has greater storage capacity but also increased latencies. In this case, the CPU would first check the smallest level (e.g., L1) cache for the required instructions/data. If a cache hit results, the CPU can proceed at high speed; otherwise, the next larger cache (e.g., L2) is checked, and so on, before external memory is checked.

To be able to dynamically balance a workload among a number of processors (and, as a result, serve more users faster), symmetric multiprocessing may be implemented in a computer or system (e.g., as a symmetric multiprocessor (SMP)). Symmetric multiprocessing generally refers to the processing of programs by multiple processing units or nodes (e.g., each having one or more CPUs or cores, and/or with integrated system on chip (SOC) which includes a hierarchy of cache levels, memory interface, I/O device interface, and/or system directory (SD)) that share a number of components such as an operating system and main memory via a bus and/or data path. The main memory may be appropriately partitioned or divided into a number of sections (e.g., each associated with a particular address range) for use in storing shared data (e.g., accessible by any of the nodes), private data (e.g., accessible by only one or more particular nodes), and the like.

Generally, an SMP allows any of the nodes (e.g., 2, 4, and/or the like) to work on any task no matter where the data for that task is located in memory, provided that each task in the system is not in execution on two or more nodes at the same time. An SMP may have a "glueless" configuration in which the various nodes are connected with each other using coherence links, and the term "glueless" generally refers to the ability of one processor to communicate with other processors without special "glue" (e.g., circuitry, logic, and so on) to tie them all together. Assuming proper operating system support, an SMP can easily move tasks between processors to balance workloads efficiently.

In the event that a particular node in an SMP experiences a cache miss in relation to one or more of its caches, the node often checks the caches of the other nodes in the SMP before resorting to reading/writing the data/instructions from/to the main memory. In this regard, one or more of the nodes may include an SD that is operable to determine (e.g., via logic) where in the SMP a particular cache line resides. For instance, the SD may include node IDs (e.g., $Node_0$, $Node_1$, and so forth), corresponding physical addresses (PA) in memory for each node, cache line tags, logic, and the like. Upon a node experiencing a cache miss in its local cache, the node may then send a node request (NR) to the system directory which executes logic to determine whether a copy of the cache line is resident in the cache of another node and/or the main memory.

In SMPs, such as directory-based and glueless SMPs, many processes, modules and the like utilize contiguous, consecutive, or continuous node IDs (CNIDs) that generally represent a relative relation between configured nodes (e.g., such as $CNID_0$, $CNID_1$, $CNID_2$, and so on), which may be different than a total number of nodes. For instance, upon experiencing a cache miss, each node typically maintains logic (e.g., hashing algorithm) that allows the node to determine which node is the directory node (DN) (i.e., the node in the SMP that maintains the SD for the cache miss address), where the logic generates a CNID for the DN between $CNID_0$ and $CNID_{n-1}$ (where n is the total number of configured nodes, which may be equal to or less than the total node capacity of the SMP). Upon obtaining the DNCNID, the node can then attempt to locate the cache line in the cache of another node via accessing the DN. Furthermore, the SD is typically required to utilize CNIDs (e.g., as opposed to node IDs that are independent of the number of configured nodes of the SMP) to facilitate implementation of the same.

SUMMARY

While maintaining or otherwise utilizing CNIDs for the nodes in the system directory facilitates SD installation and DN determination, it has heretofore inhibited the ability of users to perform dynamic configurations, deconfigurations, and reconfigurations of nodes within an SMP. Continuing with the above example, assume that the SMP was an eight-node capacity SMP configured with eight nodes. Imagine that sometime later, a user chooses to deconfigure one of the nodes (e.g., take it off line or otherwise make it unavailable for processing within the SMP). As the SD is at least sometimes required to maintain CNIDs for the various nodes, the current CNIDs in the system directory would need to be renumbered to account for the deconfigured node (e.g., if the node having $CNID_2$ was deconfigured, then old $CNID_3$ would need to be renumbered to new $CNID_2$, old $CNID_4$ would need to be renumbered to $CNID_3$, and so on).

Having to renumber the CNIDs of the nodes upon a deconfiguration, reconfiguration, or the like introduces a number of difficulties and/or inefficiencies into the SMP. In one regard, cacheable address space in the main memory for each node is typically a function of node ID. For instance, "physical address (PA) [45:43]" may indicate the home address space corresponding to a particular node ID. However, changing the number of configured nodes (e.g., via a deconfiguration, reconfiguration, etc.) and, thus, renumbering the CNIDs for the remaining nodes necessarily requires corresponding changes to the cacheable physical address space of all or at least some of the main memory and, often, requires a resultant reboot of the entire hardware system.

Furthermore, SMPs are often associated with various software (SW) configuration handles (e.g., pointers) that reference I/O devices interconnected to the SMP. For instance, these SW configuration handles may be pathnames that start with the root complex of the fabric which, in turn, can be a function of the node ID of the node containing the root complex. As a result, if the SMP is brought down and a processor is removed from the configuration, renumbering of the node IDs would affect many (e.g., potentially all) of the SW configuration handles that are expected to remain unchanged when the system is rebooted.

In this regard, disclosed herein are methods and apparatuses that allow for the dynamic configuring, reconfiguring and deconfiguring of nodes in an SMP in a manner substantially free of many of the aforementioned inefficiencies associated with the same such as system reboots, SW configuration handle changes, and/or the like. Initially, each location on or within an SMP that receives a node may be associated with a substantially static geographic node ID (GNID) that generally represents a geographic location of a node that is independent of whether or not the node is configured or deconfigured and that remains associated with a particular node even as other nodes are added, deconfigured, removed, and the like. For instance, cacheable address space, configuration handles, and the like may continue to utilize GNIDs for the nodes as the SMP is being deconfigured, reconfigured, and the like.

As will be discussed in more detail herein, conversion logic that is operable to convert or otherwise map each node GNID to a corresponding CNID (and/or vice versa) may be intelligently implemented within an SMP to allow various components and processes in or associated with the SMP to utilize a CNID or GNID for the nodes as appropriate. For instance, conversion logic may be implemented in or otherwise be associated with the SD so that GNIDs in NRs received at the SD may first be converted to corresponding CNIDs before processing occurs at the system directory (which, as discussed previously, is typically required to utilize CNIDs) to determine where cache line copies exists and the like. Before the SD sends forwarded requests (FRs) to one or more nodes for the requested cache lines or data, the conversion logic may convert any CNIDs in the FRs back to GNIDs (e.g., so that subsequent processes and components can deal with the static GNIDs instead of the dynamically changing CNIDs). For instance, routing tables within the SMP (which allow requests and other packets to be appropriately routed between nodes) may continue to utilize GNIDs to index the tables instead of having to be constantly updated to account for updated CNIDs. In any case, many of the previously discussed inefficiencies associated with the renumbering of node IDs after a deconfiguration, reconfiguration, or the like can be limited or reduced.

In one aspect, a method for use with an SMP having a plurality of nodes including generating, at a first of the plurality of nodes of the SMP, an NR for an information packet needed for processing in the first node, where the first node is a requester node RN; determining a CNID of a directory node (DN) of the SMP, where the DN is one of the plurality of nodes, and where the DN includes a SD operable to determine a location within the SMP having a copy of the information packet; converting the CNID of the DN into a corresponding GNID to create a DN GNID (DNGNID); and communicating the NR for receipt at one of the plurality of nodes associated with the DNGNID.

In one embodiment, the NR may include at least a portion of a physical address in main memory of the information packet, and the method may further include utilizing, at the SD, the physical address portion to determine where at least one copy of the information packet resides in the SMP. In another embodiment, the NR could include a GNID of the RN, and the method may further include converting the GNID of the RN into a corresponding CNID to create an RN CNID (RNCNID), and utilizing, at the SD, the RNCNID to determine where at least one copy of the information packet resides in the SMP. In a further embodiment, the method may include determining, at the SD, a CNID of one of the plurality of nodes that has access to at least one copy of the information packet, the one of the plurality of nodes being a request destination node RDN, converting the CNID of the RDN into a corresponding GNID, and forwarding a forwarded request (FR) for receipt at the RDN, where the FR includes at least a portion of the NR.

In another aspect, a symmetric multiprocessing system includes a plurality of configured processing nodes interconnected to each other by an inter-node communication fabric, where each processing node includes at least one cache, a GNID representing a location within the SMP system of the processing node, and a CNID representing one of a plurality of consecutively numbered CNIDs representing all of the configured processing nodes in the SMP system. The symmetric multiprocessing system also includes a SD located within at least one of the processing nodes, where the SD utilizes the CNIDs of the processing nodes to determine one or more processing nodes within the symmetric multiprocessing system having access to copies of particular information packets usable by the processing nodes. Also, the symmetric multiprocessing system includes a mapping module that converts processing node GNIDs into corresponding CNIDs for use by the SD.

In a further aspect, a method for use with an SMP having a plurality of nodes includes receiving, at a first of a plurality of nodes of the SMP, a node request (NR) for an information packet needed for processing in the SMP; determining, at the first node, a continuous node ID (CNID) of one of the plurality of nodes that has access to at least one copy of the needed information packet, where the CNID represents a relative relation of the one of the plurality of nodes relative to other configured nodes of the SMP, and where the one of the plurality of nodes comprising a request destination node (RDN); converting the CNID of the RDN into a corresponding geographic node ID (GNID) to create an RDN GNID (RDNG-NID), where the GNID represents a geographic location of the RDN within the SMP; and forwarding a forwarded request (FR) for receipt at the RDN, where the FR includes at least a portion of the NR.

In addition to the exemplary aspects and embodiments described above, further aspects and embodiments will become apparent by reference to the drawings and by study of the following descriptions.

BRIEF DESCRIPTION OF THE DRAWINGS

FIG. 12a is a block diagram of a mapping table illustrating corresponding GNIDs and CNIDs for the plurality of nodes of the SMP of FIG. 1 and the process flows of FIGS. 6-7 at a first time.

FIG. 12b is a block diagram of a mapping table illustrating corresponding GNIDs and CNIDs for the plurality of nodes of the SMP of FIG. 1 and the process flows of FIGS. 6-7 at a second time.

DETAILED DESCRIPTION

The present disclosure is generally directed to systems, apparatuses, and methods that allow for dynamically deconfiguring, reconfiguring, and/or otherwise configuring nodes (e.g., processors) in a symmetric multiprocessor (SMP) or a symmetric multiprocessing system in a manner that avoids, or at least limits, many of the current inefficiencies in doing the same. As will be discussed herein, a number of modules, tables, and the like that are configured to generate node IDs (e.g., CNIDs or GNIDs) and/or convert node IDs from one form to another form (e.g., from a CNID to a corresponding GNID and/or vice versa) can be intelligently implemented within an SMP to allow the various processes and/or components of an SMP to utilize the node IDs in a more efficient manner. For instance, as SDs in an SMP at least sometimes need to work with CNIDs (e.g., for use in determining at which node a particular requested cache line resides), any node GNIDs that are sent to the SD for processing can first be converted into corresponding CNIDs for processing by the SD, after which time any CNIDs can be converted back into corresponding GNIDs. As another example, as routing logic within an SMP that determines how a communications can be routed between nodes typically utilizes node GNIDs, any CNIDs that are to be sent to the routing logic may be converted into corresponding GNIDs before processing by the routing logic. By appropriately converting node IDs from one form to another form (e.g., from a node CNID into a corresponding GNID) or vice versa depending upon the particular process utilizing such node IDs (e.g., an inter-SMP communication process), dynamic node configurations, deconfigurations and the like may be formed in a manner free of inefficiencies such as renumbering of node IDs, system reboots, SW configuration handle changes, and the like.

Figure 1:
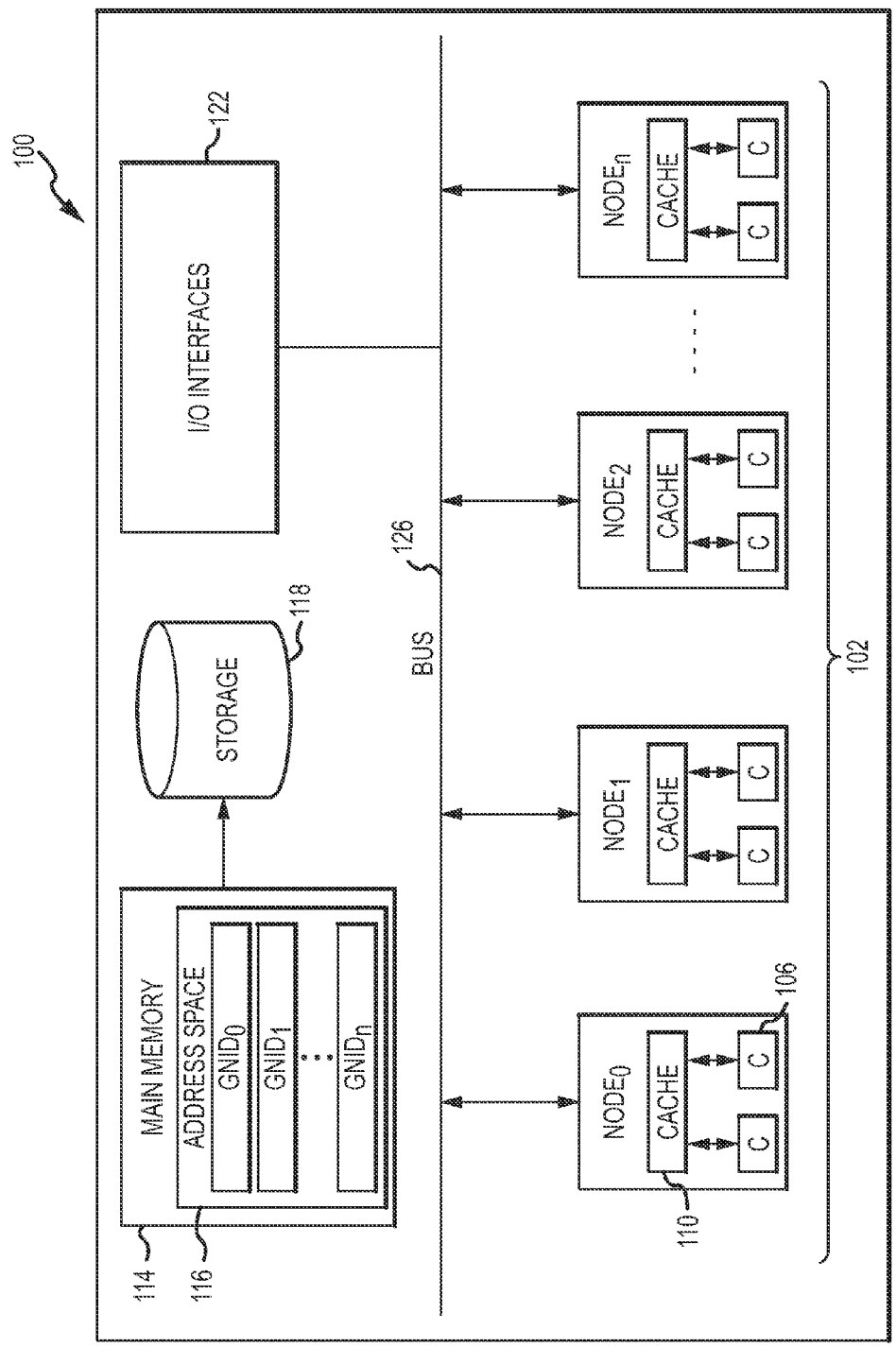
FIG. 1 is a block diagram of a computer system or SMP that facilitates dynamic configurations, reconfigurations and deconfigurations of one or more of a plurality of interconnected computing nodes.

With initial reference to FIG. 1, a block diagram of a computer system or SMP 100 that facilitates dynamic configurations, reconfigurations, and deconfigurations of one or more of a plurality of interconnected computing nodes 102 (e.g., $Node_0$, $Node_1$, $Node_2$, $Node_n$, and/or the like) is shown. Broadly, the SMP 100 may include the plurality of nodes 102 (e.g., each being implemented on a semiconductor die or chip), main memory 114 (e.g., volatile storage such as one or more DRAM devices such as DDR3 devices), mass storage 118 (e.g., non-volatile computer readable medium such as disk drive(s), solid-state drive, etc.), input/output interfaces 122 (e.g., for receiving input data from a user such as from a keyboard, pointing device, and so on and for providing output data to a user such as via a display monitor, a speaker, and a printer), and the like, all of which may be appropriately communicatively interconnected via one or more interconnects/busses 126 and/or the like. Among other components and interconnects, each node 102 may include one or more processor cores (C) 106 for fetching "information" (e.g., instructions and/or data) from one or more caches 110, executing the fetched information, and/or storing the information in the one or more caches 110 in a quickly accessible manner. Each core 106 may include and/or have access to any appropriate memory hierarchy coupled together by bus 126 and other communication interconnects and including main memory 114 along with a number of caches such as a local, L1/L2 cache (not shown) within the core 106, L3 caches (e.g., cache 110), and/or the like. For instance, the caches 110 and/or other caches may be in the form of static random access memories (SRAMs) or DRAMs. Each node 102 may include or be assigned one or more particular range in address spaces 116 in main memory 114 that may be accessed by the node 102 to fetch information for storage in cache or other cache, for execution by cores 106, and the like.

Figure 2:
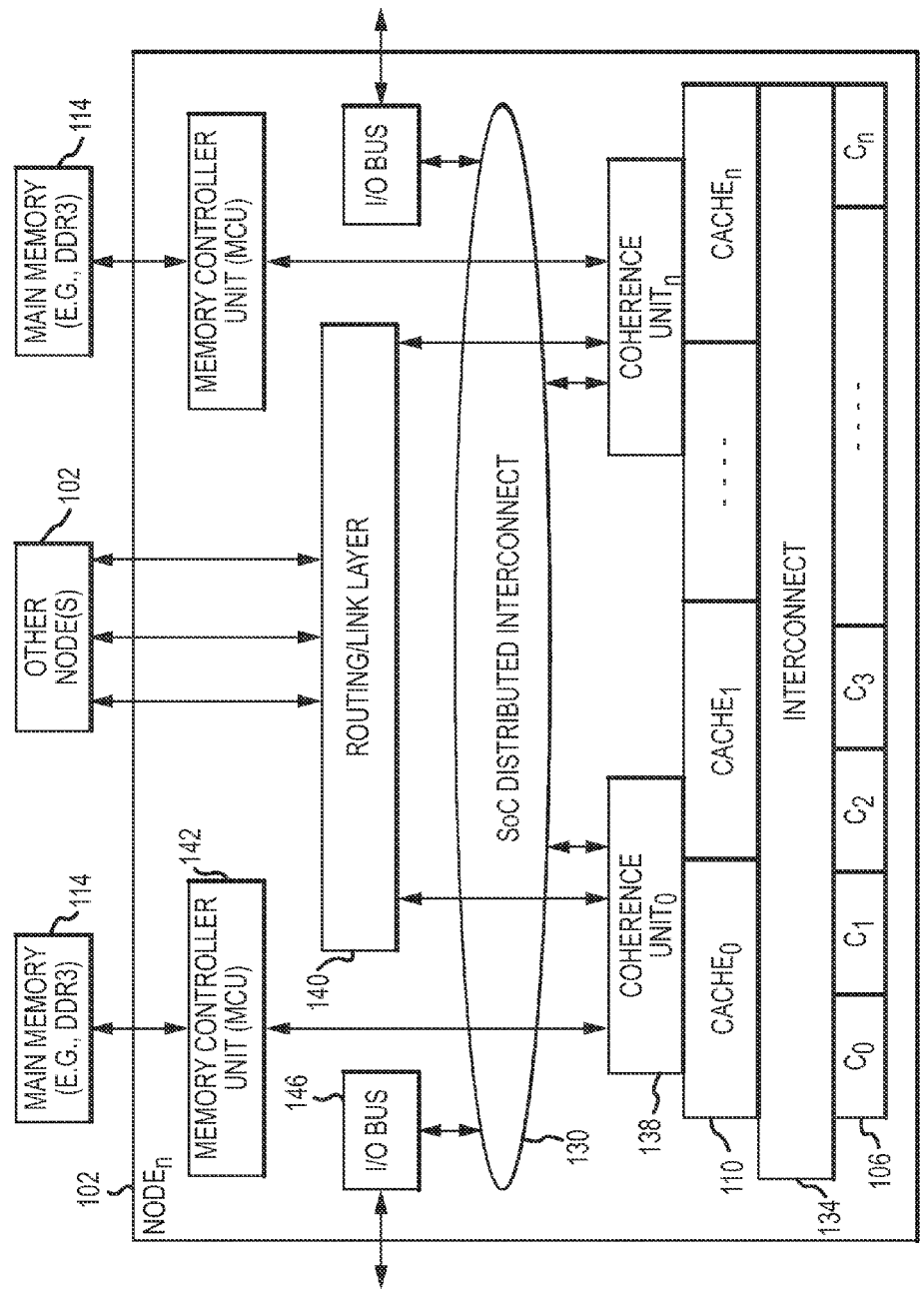
FIG. 2 is a block diagram illustrating a more detailed view of the one of the nodes of the SMP of FIG. 1.

FIG. 2 presents a more detailed block diagram of one of the nodes 102 of FIG. 1 according to one embodiment, although it is to be understood that the present disclosure is not necessarily limited to the specific implementation shown. In this embodiment, the node 102 may be implemented on a die or chip including a system on a chip (SoC) interconnect 130 that broadly serves to electrically/communicatively interconnect a number of the various components and processes of the node 102. As shown, a plurality of cores 106 (e.g., $C_0$, $C_1$, $C_2$, and the like) of the node 102 may be appropriately interconnected to a plurality of caches 110 (e.g., L2 or L3 caches, $Cache_0$, $Cache_1$, and the like) via a "core to cache" interconnect 134 (e.g., crossbar or switch). Furthermore, as it is possible to have many copies of a particular instruction or piece of data (e.g., one in main memory, one in one or more caches of the nodes 102, and the like), it is useful to ensure that changes to one of the copies of the instruction or piece of data are made to all other copies of the instruction or piece of data (e.g., to avoid conflicts, errors, and the like).

In this regard, the node 102 may include one or more cache "coherence" modules or units 138 (e.g., $Coherence\ Unit_0$, $Coherence\ Unit_n$, and the like), each of which is broadly operable for facilitating cache line coherence among one or more caches of the node 102 (e.g., cache 110), one or more caches of other nodes 102, and main memory 114. For instance, each coherence unit 138 may snoop or otherwise communicate with other nodes 102 via a routing/link layer 140, address space 116 in main memory 114 via a memory controller unit (MCU) 142, and the like.

Figure 3:
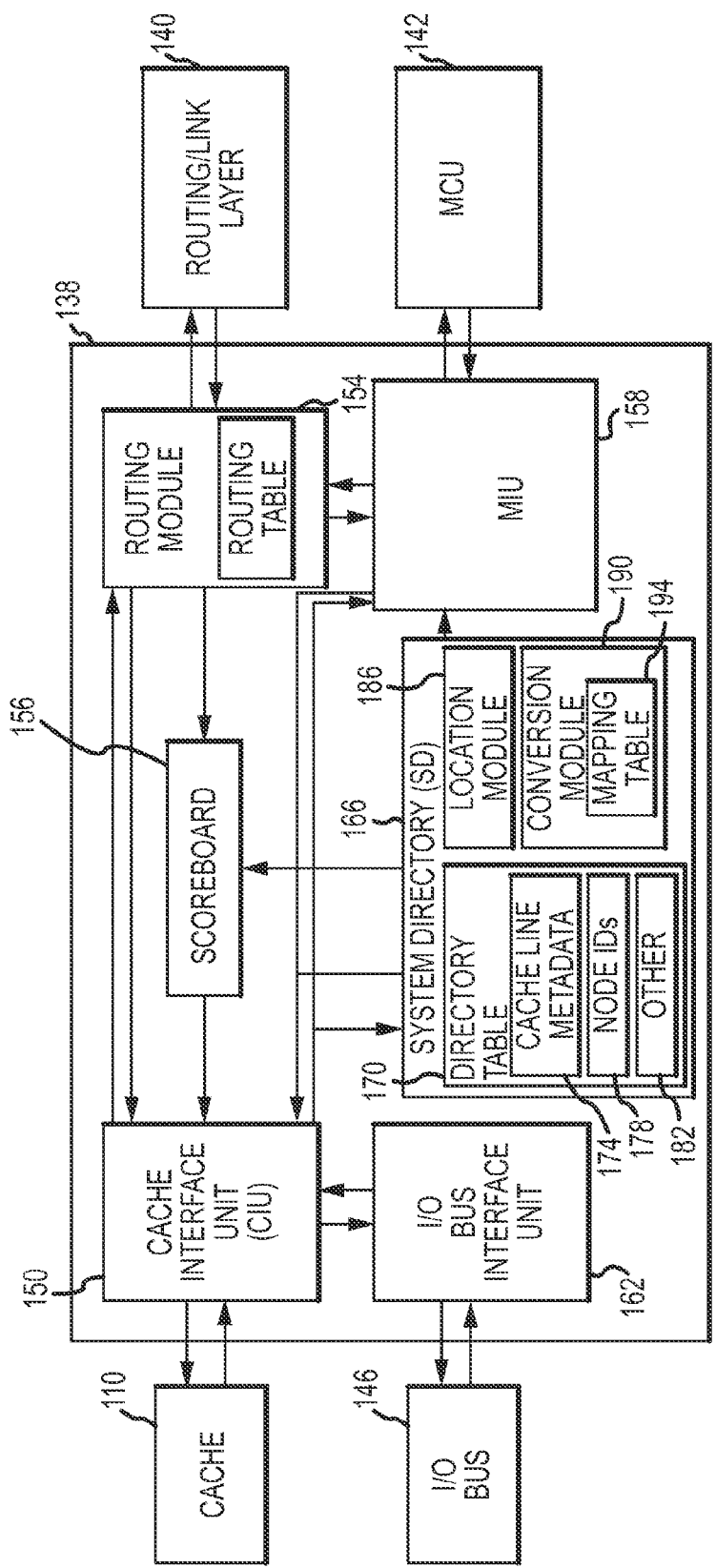
FIG. 3 is a block diagram of a coherence unit of the node of FIG. 2, where the coherence unit is broadly responsible for maintaining coherence of information stored in the various caches and main memory of the SMP.

As shown in the block diagram of FIG. 3, one or more of the cache coherence units 138 may include a cache interface unit (CIU) 150 for facilitating access to cache 110 (e.g., level 3 (L3) cache and/or the like) associated with the node 102, a routing module 154 for determining appropriate inter-node routes via the routing/link layer 140 for communications (e.g., NRs and the like) sent among the nodes 102 of the SMP 100, a memory interface unit (MIU) 158 for communicating with the MCU 142 to access the node's 102 associated range in the address space 116 of main memory 114, and/or an I/O bus interface unit 162 for communicating with I/O devices via I/O bus 146.

As also shown in FIG. 3, the coherence unit 138 in at least some situations may include an SD 166 that is broadly responsible for keeping track of and/or determining status information (e.g., multiple copies, modified, locations, and the like) for the various cache lines in the SMP 100. For instance, the SD 166 may include a directory table 170 including a plurality of appropriately arranged entries for the various cache lines maintained in the caches and main memory 114 of the SMP 100. For instance, the directory table 170 may include cache line metadata 174 (e.g., physical addresses in main memory 114 or portions thereof (e.g., tags) associated with respective cache lines, cache line states and statuses represented by bits, and the like), node IDs 178 (e.g., node CNIDs, discussed below), and/or other information in relation to the various cache lines. The SD 166 may also include a location module 186 in the form of any appropriate logic or protocol that accesses the directory table 170 to determine a location of one or more particular cache lines (e.g., as part of a snoop request or NR received from one of the nodes 102).

Furthermore, the SD 166 includes or at least has access to a conversion module 190 that is operable to utilize a mapping table 194 to convert node GNIDs received in NRs or the like into corresponding CNIDs for use by the location module 186 in accessing the directory table 170 and determining locations of requested cache lines. As discussed herein, appropriately converting node GNIDs into corresponding CNIDs (and/or vice versa) during NR processing (depending upon the particular process or component utilizing the node IDs) advantageously allows for deconfigurations, reconfigurations, and configurations of one or more nodes 102 of the SMP 100 in a manner substantially free of requiring the renumbering of all node IDs in the SMP 100, reboots of the SMP 100, configuration handle changes, and the like.

Before discussing conversions between node GNIDs and CNIDs in the context of processing an NR (e.g., after deconfiguration of a node 102 of the SMP 100), reference is now made to the mapping tables 500/500' of FIGS. 12a-12b (e.g., mapping table 194) which illustrate mappings between GNIDs 508 (e.g., node IDs representative of a geographic location of a node within the SMP 100) and CNIDs 512 (e.g., node IDs representative of a relative relation of configured nodes in the SMP 100) of nodes 504 (e.g., nodes 102) of the SMP 100. Generally, NR processing makes use of node IDs of various nodes 102 at a number of stages of the NR processing (e.g., determining the node ID of the node 102 having the SD, determining the node ID of the node 102 storing a copy of a particular cache line in its cache, determining inter-node routing between nodes 102, and the like). Furthermore, some of the stages oftentimes utilize CNIDs (i.e., instead of GNIDs) during such processing as doing so can simplify processes such as SD lookup and the like.

However, use of CNIDs can have a negative impact on other aspects of SMP 100, especially after node configuration changes (e.g., deconfigurations, reconfigurations, and the like). For instance, deconfiguration of a node 102 of the SMP 100 may require renumbering of at least some of the CNIDs of the remaining configured nodes 102 (e.g., in the event that a node 102 associated with $CNID_5$ was deconfigured, the node 102 previously associated with $CNID_6$ would, after the deconfiguration, become associated with $CNID_5$; the node 102 previously associated with $CNID_7$ would, after the deconfiguration, become associated with $CNID_6$, and so on). While maintaining CNIDs (e.g., such as renumbering CNIDs for the remaining configured nodes 102 after deconfiguration of one or more of the nodes 102) may be advantageous for processes such as DN determination, SD lookup, and the like, it may disadvantageously require corresponding changes to the cacheable physical address space of all or at least some of the main memory (as such cacheable physical address space may be associated with node IDs) and ultimately lead to a reboot of the entire hardware system, among other disadvantages.

In this regard, the present disclosure makes use of one or more mapping tables 194 (e.g., mapping tables 500/500') that allow various processes running in an SMP 100 (e.g., as part of NR processing) to utilize either GNIDs or CNIDs for the nodes 102 as may be necessary or otherwise appropriate. In one arrangement, node GNIDs may be the "default" node ID throughout an SMP 100 while conversion modules 190 (that utilize mapping tables 400) may be appropriately implemented to convert node GNIDs into corresponding CNIDs for those processes or modules that require or otherwise make use of node CNIDs instead of corresponding GNIDs.

The mapping table 500 of FIG. 12a corresponds to a four-node SMP 100 having four configured nodes 504 (e.g., $Node_0$, $Node_1$, $Node_2$, $Node_3$) respectively associated with GNIDs 508 (e.g., $GNID_0$, $GNID_1$, $GNID_2$, $GNID_3$) and corresponding CNIDs 512 (e.g., $CNID_0$, $CNID_1$, $CNID_2$, $CNID_3$). The mapping table 500' of FIG. 12b corresponds to the four-node SMP 100 of FIG. 12a, but where $Node_1$ has been deconfigured (e.g., declared "dead," taken offline, and/or the like). As shown, the GNIDs 508 for the remaining configured nodes 504 (e.g., $Node_0$, $Node_2$, $Node_3$) remain the same (e.g., $GNID_0$, $GNID_2$, $GNID_3$). Also, the GNID 508 of now deconfigured $Node_1$ (e.g., GNID1) has been left in the mapping table 500' to signify that the location within SMP 100 where deconfigured $Node_1$ resides or resided is still associated with the same GNID 508 (i.e., GNIDs 508 are associated with locations instead of whether a node is configured or deconfigured).

However, those CNIDs 512 (e.g., $CNID_2$ and $CNID_3$ from FIG. 12a) that are numerically after the CNID 512 of the deconfigured node 504 (e.g., $CNID_1$ from FIG. 12a) have been remapped or otherwise changed (e.g., $CNID_2$ in FIG. 12a has been remapped to $CNID_1$ in FIG. 12b, and $CNID_3$ in FIG. 12a has been remapped to $CNID_2$ in FIG. 12b) to maintain the continuity of the CNIDs 512 of the SMP 100. For instance, the mapping tables 500 may be appropriately updated after configuration changes to the SMP 100.

Figure 4:
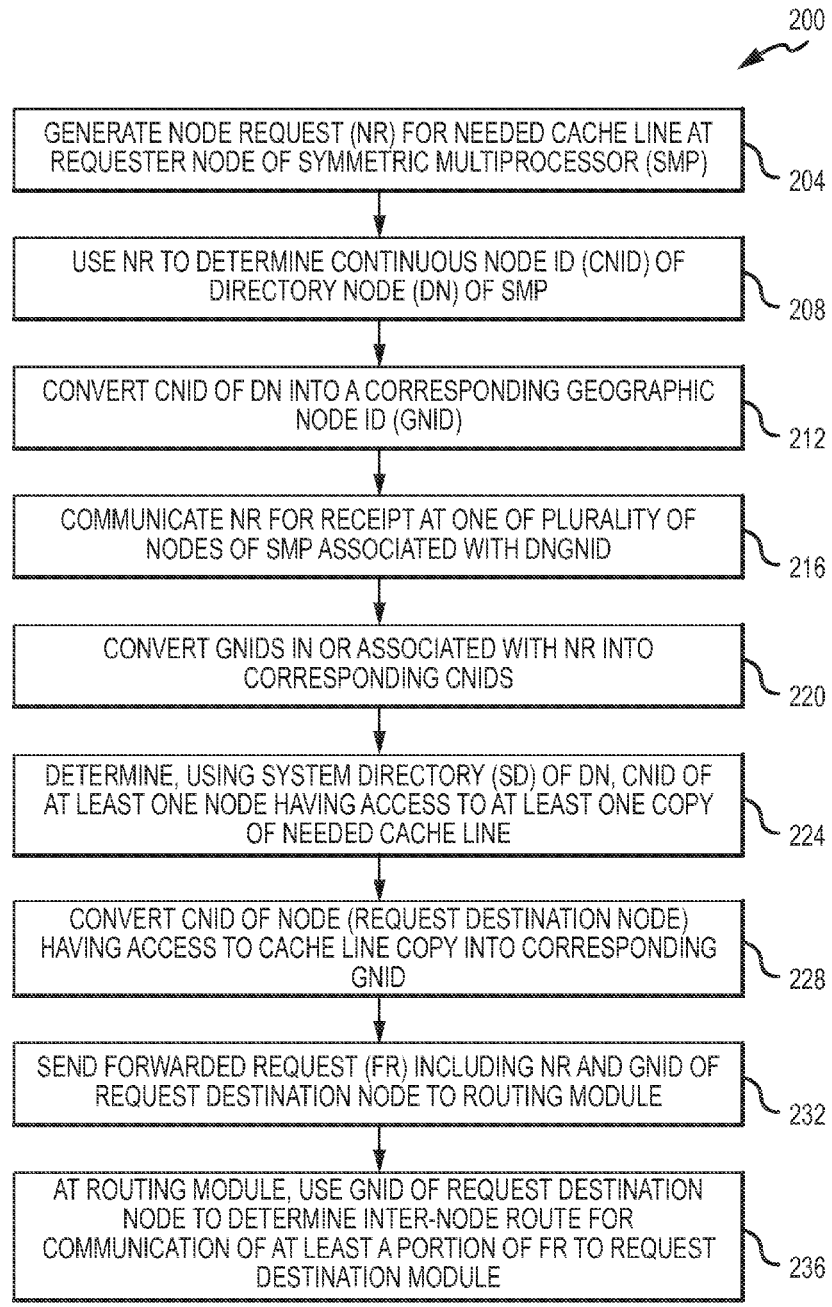
FIG. 4 is a flow diagram illustrating steps that may be performed as part of fulfilling NRs for cache lines in a manner that allows for the dynamic configuration of nodes in the SMP.
Figure 5:
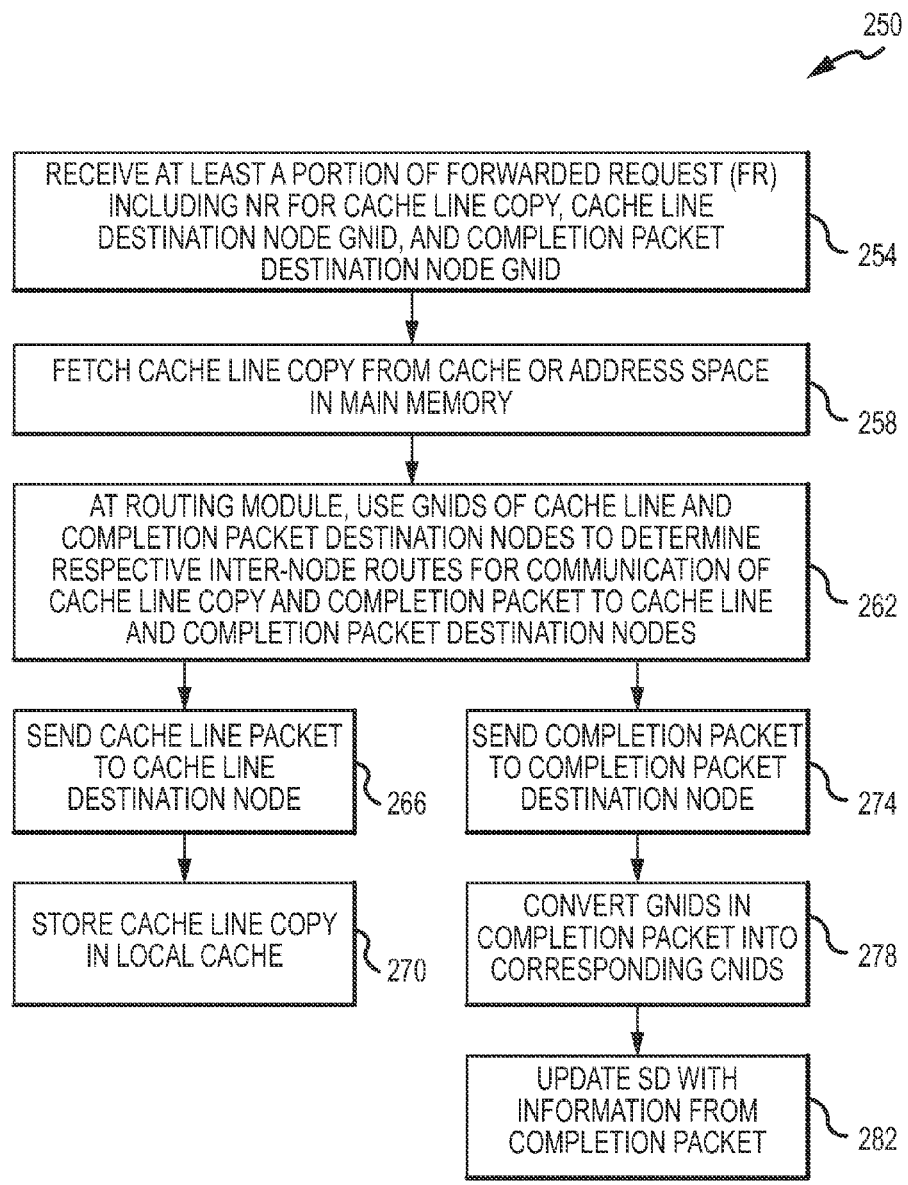
FIG. 5 is another flow diagram illustrating steps that may be performed as part of fulfilling NRs for cache lines in a manner that allows for the dynamic configuration of nodes in the SMP.
Figure 6:
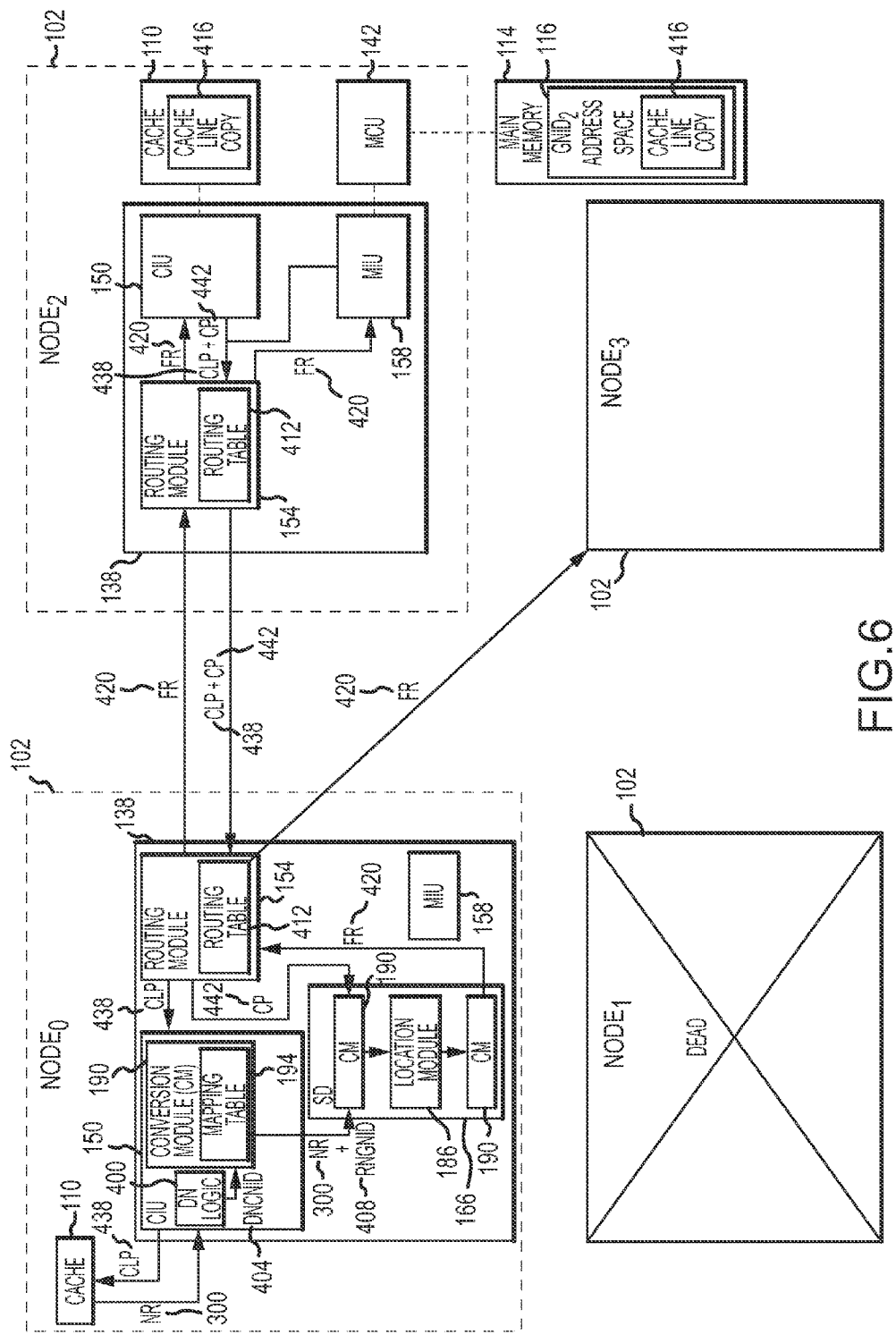
FIG. 6 is a block diagram illustrating various process flows involved in fulfilling NRs among a plurality of nodes in an SMP, where one of the nodes is deconfigured, according to one embodiment.
Figure 7:
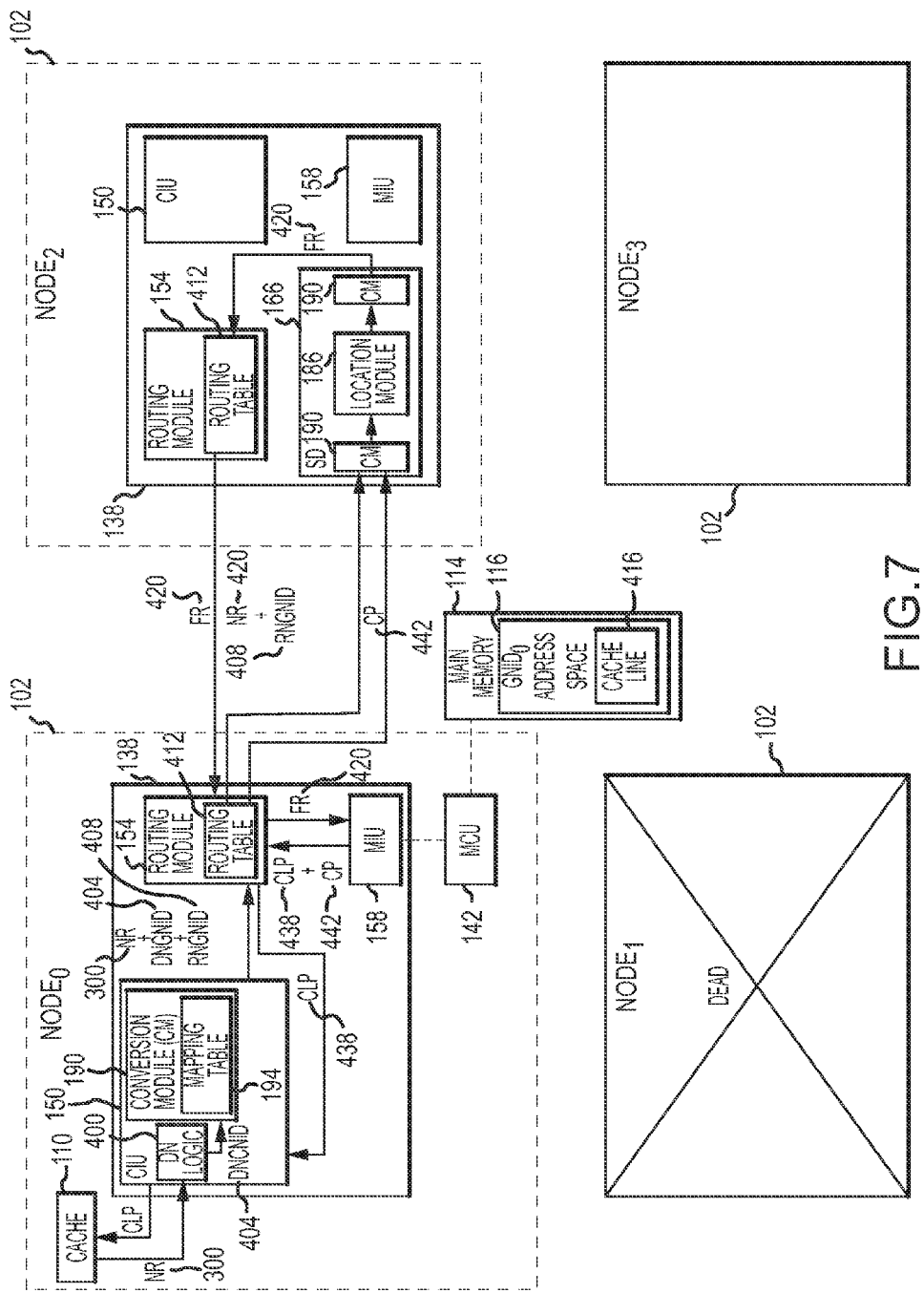
FIG. 7 is a block diagram illustrating various process flows involved in fulfilling NRs among a plurality of nodes in an SMP, where one of the nodes is deconfigured, according to another embodiment.

Turning now to FIGS. 4-5, flow diagrams or methods of steps that may be performed as part of fulfilling NRs for caches lines including the intelligent conversion of CNIDs to GNIDs (and vice versa) are illustrated to allow for dynamic configuration changes of nodes 102 of an SMP 100 in a manner that limits or at least reduces many of the previously-discussed inefficiencies such as system reboots, configuration handle changes, and the like. In conjunction with a discussion of the flow diagrams of FIGS. 4-5, reference will also be made to FIGS. 6-11 which are block diagrams illustrating various process flows that may occur as part of a lifecycle of a NR (e.g., in relation to generating an NR, determining which node is the DN, determining at which node a particular cache line resides, and/or the like). Specifically, FIGS. 6 and 7 represent examples of different NR process flows in the same four-node SMP 100, where one of the nodes (e.g., $Node_1$ 102) has been deconfigured leaving three remaining configured nodes (e.g., $Node_0$, $Node_2$ and $Node_3$ 102).

At 204 of the method 200 of FIG. 4, an NR for a needed piece of information (e.g., a cache line such as an instruction operand or a piece of data) may be generated at a requester node (RN) of an SMP. For instance, and with reference to the block diagrams of FIGS. 2, 6 and 7, imagine that one of the processing cores 106 of $Node_0$ 102 experiences a load or cache line miss in relation to its respective cache 110 (e.g., L3 cache). In this case, the cache 110 may generate an NR 300 for the particular cache line(s) and issue or otherwise communicate the NR 300 to the CIU 150 of the coherence unit 138. In this example, therefore, $Node_0$ 102 may be considered the RN.

Figure 8:
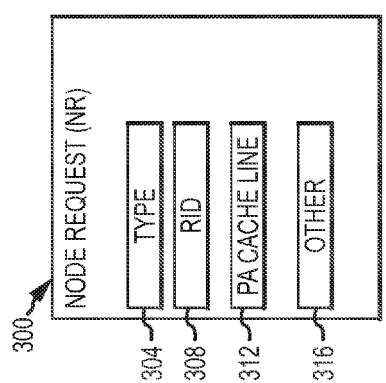
FIG. 8 is a block diagram of an NR of the process flows of FIGS. 6-7.
Figure 10:
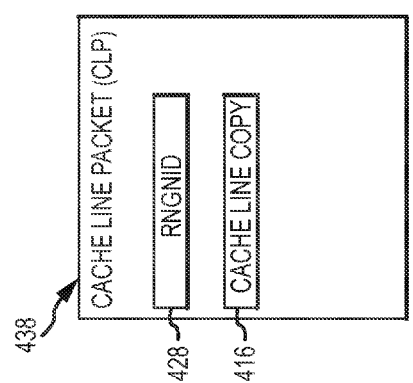
FIG. 10 is a block diagram of an information packet (IP) of the process flows of FIGS. 6-7.

As shown in FIG. 8, the NR 300 may include a number of objects, one of which may be a type object 304. For instance, the type object 304 may indicate that the NR 300 is a "regular" NR to be sent to the SD 166 of the SMP 100 to determine which cache(s) 110 or assigned address range in memory 114 has a copy of a needed cache line. In any event, the NR 300 may include additional objects such as a request ID (RID) 308 (e.g., an ID that uniquely identifies the NR), at least a portion of a physical address (PA) 312 in memory 114 of the needed cache line, and/or other information 316 (e.g., eviction way to instruct SD how to install an L3 tag, dirty eviction to instruct SD whether it needs to write back a victim cache-line to memory 114, and/or the like).

Returning to FIG. 4, the method 200 may include at 208 using the NR 300 to determine a CNID of a DN of the SMP 100 (i.e., the node of the SMP including or having access to the SD 166, which may be the same as or different than the RN). In one arrangement, and as shown in FIGS. 6 and 7, the CIU 150 of $Node_0$ 102 may include a DN determination module 400 (e.g., having DN logic) that receives the NR 300 and utilizes a hashing algorithm to determine the DNCNID 404 (e.g., a 3-node hashing algorithm based on the three configured nodes of the SMP 100 (e.g., $Node_0$, $Node_2$ and $Node_3$ 102).

In the example of FIG. 6, the DN determination module 400 generates a DNCNID 404 of "$CNID_0$" (e.g., see FIG. 12b) as the SD 166 is located in $Node_0$ 102. In the example of FIG. 7, the DN determination module 400 generates a DNCNID 404 of "$CNID_1$" remapped to $GNID_2$ (e.g., see FIG. 12b) as the SD 166 is located in $Node_2$ 102. In any event, and once the DNCNID 404 has been determined at 208, the method 200 may include converting 212 the DNCNID 404 into a corresponding DNGNID (which facilitates routing or transfer of the NR 300 to the SD 166) in addition to any CNIDs into corresponding GNIDs and then communicating 216 the NR 300 for receipt at the SD 166. For instance, the DNCNID 404 may be sent to conversion module 190, which may utilize mapping table 194 (e.g., mapping table 500' of FIG. 12b) to convert $CNID_0$ into $GNID_0$ (in the case of FIG. 6) or $CNID_1$ into $GNID_2$ (in the case of FIG. 7). As part of or in addition to the NR 300, the CIU 150 may also send the RNGNID 408 (e.g., $CNID_0$) for receipt at the SD 166 to allow the cache line copy, once retrieved, to be appropriately returned to the RN.

In the example of FIG. 6, and as the RN and DN both correspond to $Node_0$ 102, the NR 300 and RNGNID 408 (e.g., $GNID_0$) may be appropriately forwarded within $Node_0$ 102 from the CIU 150 to the SD 166. In the example of FIG. 7, it can be seen how the RN (e.g., $Node_0$ 102) is different than the DN ($Node_2$ 102). In this case, the NR 300, DNGNID 404 (e.g., $GNID_2$), and RNGNID (e.g., $GNID_0$) may be forwarded from the CIU 150 to routing module 154. For instance, the routing module 154 may use the DNGNID 404 as a lookup into a routing table 412 to determine an appropriate inter-node route (e.g., via routing/link layer 140 of FIG. 2) from $Node_0$ 102 to $Node_2$ 102. As discussed previously, use of node GNIDs to determine inter-node routing may be more advantageous than the use of CNIDs as GNIDs remain the same throughout node configuration changes (i.e., unlike CNIDs which may need to be renumbered or otherwise changed after configuration changes). Upon determining the inter-node route, the routing module 154 may function to communicate or otherwise send the NR 300 and RNGNID 408 to the SD 166 at $Node_2$ 102.

Returning to FIG. 4, the method 200 may include converting 220 any GNIDs in or otherwise associated with the NR (e.g., RNGNID 408) into corresponding CNIDs, and then determining 224, using the SD of the DN, a CNID of at least one node having including or having access to at least one copy of the needed/requested cache line(s) (e.g., referred to herein as a "request destination node" or RDN). As discussed previously, SDs of SMPs at least sometimes typically utilize node CNIDs (i.e., rather than corresponding GNIDs) to determine locations of needed cache lines within the SMP to simplify the lookup process and the like. In this regard, and as shown in FIGS. 6 and 7, any GNIDs received with the RN 300 at the SD 166 (e.g., RNGNID 408) may be converted via a conversion module 190 into corresponding CNIDs (e.g., using mapping table 194/500') for subsequent use by location module 186.

The location module 186 may include any appropriate logic operable to access directory table 170 (shown in FIG. 3, not shown in FIGS. 6-7) and determine the CNID(s) of any of the configured nodes 102 (e.g., any RDNCNIDs) having a copy of the cache line(s) in their associated caches 110. In one arrangement, the location module 186 utilize the RNCNID and/or a tag (e.g., L3 tag portion) of the PA 312 of the RN 300 as lookups into the directory table 170 to determine if a copy of the needed cache line exists in the cache 110 of one or more of the configured nodes (e.g., $Node_0$, $Node_2$ and/or $Node_3$ 102).

In the event that the location module 186 experiences a "hit" while performing the lookup (i.e., determines that at least one of the nodes 102 includes a copy of the needed cache line in its cache 110), the location module 186 may extract or otherwise obtain the CNID of the at least one node (e.g., the RDNCNID) and use the same for forwarding the NR 300 to the RDN as will be discussed below. In the case where the location module 186 determines that multiple nodes have copies of the needed cache line in their respective caches 110, the location module 186 may choose one of the nodes to be the primary RDN node for the particular cache line and then categorize the remaining nodes having copies of the particular cache line as "slave nodes."

In the event that the location module 186 experiences a "miss" while performing the lookup (i.e., determines that none of the nodes 102 includes a copy of the needed cache line in its cache 110), the location module 186 may then appropriately determine which of the nodes is the "home node" (FIN) for the particular cache line (i.e., a node 102 of the SMP 100 whose address space 116 in main memory 114 has been used to store a copy of the needed cache line). For instance, the location module 186 may utilize the PA 312 of the cache line from the NR 300 to determine a GNID of the FIN (e.g., the HNGNID) and then utilize the HNCNID for forwarding the NR 300 to the RDN (where the RDN would be the HN) as will also be discussed below. In the event that the HN happens to be deconfigured, the SD 166 may not process the NR 300 and generate an "unmapped error" message or the like (e.g., as part of a forwarded request (FR), discussed below) which may be forwarded back to the RN (e.g., to the cache 110)). In one arrangement, the location module 186 may also determine a CNID of a "completion packet destination node" (CPDN) (one of the nodes 102, such as the RN and/or the DN) to which a completion packet evidencing retrieval and communication of the needed cache line copy to the RN may be sent.

As shown in the example of FIG. 6, a cache line copy 416 is resident in the cache 110 and in the main memory address space 116 of the RDN, $Node_2$ 102. In the example of FIG. 7, a cache line copy 416 is resident in the main memory address space 116 of the RDN, $Node_0$ 102. Thus, $Node_0$ 102 is, in this example, the RDN, the RN and the FN. In any case, the method 200 may then include converting 228 any CNIDs utilized and/or generated by the location module 186 into corresponding GNIDs (e.g., via CM 190) and then sending 232 a "forwarded request" (FR) 420 to a routing module 154 for routing to the RDN. For instance, each of the RDNCNID, RNCNID and CPDNCNID may be converted into corresponding GNIDs.

Figure 9:
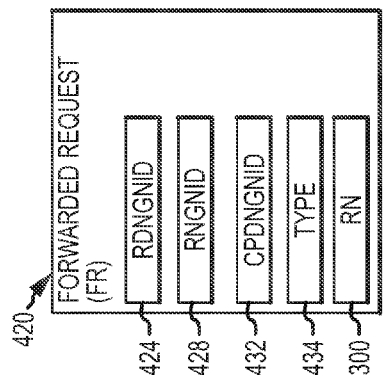
FIG. 9 is a block diagram of a forwarded request (FR) of the process flows of FIGS. 6-7.

As shown in FIG. 9, an FR 420 may include an RDNGNID 424, an RNGNID 428, a CPDNGNID 432, a "type" object 434 (e.g., indicating that the FR 420 is requesting a cache line copy from the cache 110 of the RDN, indicating that the FR 420 is requesting a cache line copy from the RDN's address space 116 in memory 114, and the like) and at least a portion of the NR 300 (e.g., the RID 308 and/or the PA 312 of the cache line).

In some arrangements, multiple FRs 420 may be generated and sent as part of a single cache line request. For instance, while a first FR 420 may be generated and sent to the RDN for fetching of the requested cache line (where the type object 434 indicates as much), a second FR 420 (e.g., an acknowledgment or "FRACK" FR) may be generated and sent to back to the RN (e.g., the CIU 150 of the RN) indicating that the NR has been processed by the SD 166 (again, where the type object 434 of the second FR would indicated as much). As another example, one FR 420 may be generated and sent to the primary RDN for fetching of the requested cache line (where the type object 434 indicates as much), one or more additional FRs 420 may be generated and sent to the slave nodes instructing the slave nodes to invalidate or erase their respective copies of the cache line (where the type object 434 indicates as much), and another FR 420 may be a corresponding acknowledgement FR to the RN. Various other types of FRs are envisioned and included within the scope of the present disclosure.

The method 200 may then include using 236 the RDNGNID 424 of the FR 420 to determine an inter-node route (e.g., via routing/link layer 140 of FIG. 2) for communication of the FR 420 to the RDN. In the example of FIG. 6, for instance, the FR 420 may be routed from the SD 166 of $Node_0$ 102 to the routing module 154 of $Node_0$ 102, whereupon the routing module 154 may extract the RDNGNID 424 (e.g., $GNID_2$) from the FR 420 and use the RDNGNID 424 (e.g., as a lookup into routing table 412) to determine an inter-node route from $Node_0$ 102 to $Node_2$ 102 for at least a portion of the FR 420. In the example of FIG. 7, for instance, the FR 420 may be routed from the SD 166 of $Node_2$ 102 to the routing module 154 of $Node_2$ 102, whereupon the routing module 154 may extract the RDNGNID 424 (e.g., $GNID_0$) from the FR 420 and use the RDNGNID 424 (e.g., as a lookup into routing table 412) to determine an inter-node route from $Node_2$ 102 to $Node_0$ 102 (the HN in the example of FIG. 7) for at least a portion of the FR 420. In the event that an acknowledgement FR 420 is generated as discussed above, the routing module 154 may use the RNGNID to determine routing of the acknowledgment request 420 to the RN.

FIG. 5 is a flow diagram of a method 250 of receiving an FR 420 (or at least a portion thereof) at an RDN and then fulfilling the FR 420. At 254, the method 250 may include receiving an FR 420 having the NR 300, a cache line packet destination node GNID (e.g., the RNGNID 428), and the CPDNGNID 432, fetching 258 the cache line copy from the cache or address space 116 of the RDN in memory 114, and then using 262 the RNGNID 428 and CPDNGNID 432 to respectively send cache line and completion packets to the RN and the CPDN (e.g., RN or DN).

With initial reference to FIG. 6, for example, the FR 420 (or at least a portion thereof) may be received at routing module 154 of $Node_2$ 102 (i.e., the RDN in this example) which may proceed to appropriately access the type object 434 to determine whether the FR 420 is to be sent to the CIU 150 and eventually the cache 110 (e.g., in the event that $Node_2$ 102 has a copy of the needed cache line in its cache 110) and/or to the MIU 158 and eventually the MCU 142 (e.g., in the event that $Node_2$ 102 has a copy of the needed cache line in its address space 116 in main memory 114). Upon receiving the FR 420, the CIU 150 and/or MIU 158 may proceed to appropriately fetch the cache line copy 416 (from the cache 110 and/or memory 114), generate a cache line packet (CLP) 438 and a completion packet (CP) 442, and then send the CLP 438 and CP 442 to the routing module 154 for forwarding to the RN and CPDN, respectively.

Figure 11:
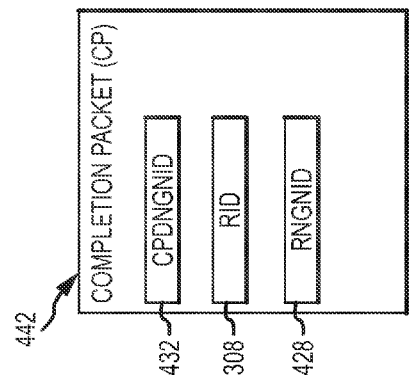
FIG. 11 is a block diagram of a completion packet (CP) of the process flows of FIGS. 6-7.

For instance, the CLP 438 may include the RNGNID 428 and the cache line copy 416 (e.g., see FIG. 10) and the CP 442 may include the CPDNGNID 432, RID 308 and RNGNID 428 (e.g., see FIG. 11). In this regard, the routing module 154 may respectively use the RNGNID 428 and CPDNGNID 432 as lookups into routing table 412 to determine appropriate inter-node routes to the RN and CPDN (which, in this example, both correspond to $Node_0$ 102. In the example of FIG. 7, for instance, the routing module 154 of $Node_0$ 102 (i.e., the RDN in this example) may, after accessing the type object 434 of the FR 420, pass the FR 420 to the MIU 158 which may proceed to fetch the cache line 416 (e.g., from the address space 116 of main memory 114 via MCU 142) and then return a corresponding CLP 438 and CP 442 to the routing module 154 of $Node_0$ 102.

Turning back to FIG. 5, the method 250 may include sending 266 the CLP 438 to the cache line destination node (e.g., the RN) and then storing 270 the cache line copy in the local cache of the RN. In FIG. 6, for instance, it can be seen how the CLP 438 may be passed from routing module 154 of the RDN (e.g., $Node_2$ 102) to the routing module 154 of the RN (e.g., $Node_0$ 102) which may proceed to forward the CLP 438 to the CIU 150 and eventually cache 110 for storage of the cache line copy 416 therein. In FIG. 7, for instance, it can be seen how the CLP 438 may be passed from routing module 154 of the RDN (e.g., $Node_0$ 102) substantially directly to the CIU 150 of the RN (e.g., in this case, also $Node_0$ 102) for eventually storage of the cache line copy 416 in the cache 110.

As also shown in FIG. 5, the method 250 may include sending 274 the CP 442 to the CPDN, converting 278 any GNIDs in the CP 442 into corresponding CNIDs, and updating 282 the SD 166 with appropriate information from the CP 442. In the example of FIG. 6, it can be seen how the CP 442 may be passed from routing module 154 of the RDN (e.g., Node$_2$ 102) to the routing module 154 of the RN (e.g., Node$_0$ 102) which may proceed to forward the CP 442 to the SD 166 whereupon GNIDs in the CP 442 (e.g., RNGNID) may be converted via a CM 190 into corresponding CNIDs (e.g., RNC-NID). In the example of FIG. 7, it can be seen how the CP 442 may be passed from routing module 154 of the RDN (e.g., Node$_0$ 102) to the SD 166 of the DN (e.g., Node$_2$ 102) (or first to the routing module 154 of the DN (e.g., Node$_2$ 102) which may proceed to forward the CP 442 to the SD 166) whereupon GNIDs in the CP 442 (e.g., RNGNID) may be converted via CM 190 into corresponding CNIDs (e.g., RNCNID). In either case, the location module 186 of the SD 166 may then proceed to update the directory table 170 (shown in FIG. 3) with information from the CP 442 (e.g., RNCNID, cache line metadata, etc.) to reflect the cache line copy 416 now being stored in the cache 110 of the RN (e.g., for future requests for the cache line).

It will be readily appreciated that many deviations may be made from the specific embodiments disclosed in the specification without departing from the spirit and scope of the invention. Also, it should be understood that the functionalities performed by many of the processes and modules discussed herein may be performed by other modules, devices, processes, etc. The illustrations and discussion herein has only been provided to assist the reader in understanding the various aspects of the present disclosure. Furthermore, one or more various combinations of the above discussed arrangements and embodiments are also envisioned.

In one arrangement, NRs 300 may be generated by a node not in response to a cache line miss, but for speculative purposes. For instance, an NR 300 may be generated and send to the HN to pre-fetch particular cache lines from the HN's address space 116 in main memory 114 and store such data in the HN's pre-fetch buffer to shorten subsequent access of such cache lines (e.g., in responsive to subsequent potential cache line misses). In the event that the FIN happens to be a deconfigured node, the routing module 154 may drop the "speculative" NR.

In another arrangement, an RN (e.g., the routing table 154 or CIU 150 may aggregate multiple CPs 442 and then send a single CP 442 to the SD 166 (e.g., when receiving multiple CPs 442 from slave nodes and a primary RDN node). In one variation, an acknowledgment (e.g., "FRACK") FR 420 sent back to the RN from the DN may have one or more fields indicating a) how many CPs 442 to be expecting, b) whether RN is required to send the CP to DN when all CPs have been received, c) DNGNID, d) the RID 308 from the original NR 300, e) whether the NR 300 came from the cache 110 of the RN or from an I/O device (e.g., DMA), and/or the like. For instance, and in the case where the CPDN is the RN, upon receiving a FRACK FR 420 from DN, the RN may forward the FRACK FR 420 to its cache 110 via CIU 150 to acknowledge that the NR 300 (with the RID 308) has been processed, and to a scoreboard 156 (e.g., object, data structure). When the FRACK FR 420 indicates that CPs 442 are to be expected, the scoreboard 156 may eventually collect such CPs 442 (e.g., all having the same RID 308) and then send a single CP 442 to the DN once all of such CPs 442 have been received. When the FRACK FR 420 indicates that no CPs 442 are to be expected, the scoreboard 156 may thus take no action in relation to the FRACK FR 420.

In a further arrangement, it may not be necessary that the CIU 150 automatically converts (e.g., via the CM 190) any CNIDs into GNIDs. For instance, and in the case of FIG. 6 whereby the SD 166 is part of the RN (i.e., the RN equals the DN), any CNIDs generated by the CIU 150 may be passed to the location module 186 of the SD 166 without converting the CNIDs into GNIDs at the CM 190 of the CIU 150 and then converting the GNIDs back into CNIDs at the CM 190 of the SD 166. Also, while it appears that numerous CMs 190 are situated at various points of the process flows, it is to be understood that such CMs 190 may actually be instances of the same CM 190, or that all of such CMs 190 are actually the same piece of logic. In a further arrangement, some embodiments envision that the MIU and MCU may be combined as part of or otherwise form the same module and/or process.

It is to be understood that not all components, modules and the like of the SMP or nodes thereof have been shown in the figures in the interest of clarity (e.g., in FIGS. 6-7 not all components of Node$_0$ and Node$_2$ have necessarily been illustrated, and no components have been shown for Node$_3$). Furthermore, the process flows of FIGS. 6-7 have merely been provided as examples of process flows between nodes of an SMP that could implement and take advantage of the node ID conversion modules and process disclosed herein (e.g., to allow for configuring/deconfiguring/reconfiguring nodes free of necessarily having to reboot the system, change configuration handles, and the like). Still further, while a four-node SMP 100 has been illustrated in the figures, it is to be understood that the present teachings apply to other arrangements of SMPs 100 (e.g., six-node, eight-node, and the like) within any number of configured/deconfigured nodes. In one arrangement, a partially configured SMP 100 could be provided to a user or customer (e.g., only four nodes of an eight-node SMP 100 being configured), thus providing the user the opportunity at a later time to upgrade the SMP 100 by adding additional nodes to the SMP 100 (e.g., reconfiguring nodes, adding new nodes, and the like). For instance, a user may merely be required to provide a small amount of information to the SMP 100 (e.g., such as number of remaining configured nodes, mappings between the GNIDs and CNIDs (e.g., see FIGS. 12a-12b), the GNIDs of the configured nodes, and/or the like) as part of configuring, reconfiguring and/or deconfiguring nodes in the SMP 100 free of having to reboot the system, change configuration handles, and the like.

Embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

A computer program (also known as a program, software, software application, script, or code) used to provide the functionality described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described. Furthermore, the flow diagrams disclosed herein have merely been presented as examples of manners in which the present teachings can be implemented and do not in all cases necessarily require all the disclosed steps and/or the particular order in which the steps have been presented.

In different embodiments, distributed computing environment may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method for use with a symmetric multiprocessor (SMP) having a plurality of nodes, comprising:
   generating, at a first of the plurality of nodes of the SMP, a node request (NR) for an information packet for processing in the first node, wherein the first node is a requester node (RN);
   determining a continuous node ID (CNID) of a directory node (DN) (DNCNID) of the SMP, wherein the DNCNID represents a relative relation of the DN relative to other configured ones of the plurality of nodes of the SMP, and wherein the DN includes a system directory (SD) operable to determine a location within the SMP comprising a copy of the information packet;
   converting the CNID of the DN into a corresponding geographic node ID (GNID) to create a DN GNID (DNGNID), wherein the DNGNID represents a geographic location of the DN among both configured and deconfigured ones of the plurality of nodes within the SMP; and
   communicating the NR for receipt at one of the plurality of nodes associated with the DNGNID.

2. The method of claim 1, wherein the NR includes at least a portion of a physical address in main memory of the information packet, and wherein the method further comprises:
   utilizing, at the SD, the physical address portion to determine where at least one copy of the information packet resides in the SMP.

3. The method of claim 2, wherein the physical address portion comprises a tag of the physical address.

4. The method of claim 1, wherein the NR includes a GNID of the RN, and wherein the method further comprises:
   converting the GNID of the RN into a corresponding CNID to create an RN CNID (RNCNID); and
   utilizing, at the SD, the RNCNID to determine where at least one copy of the information packet resides in the SMP.

5. The method of claim 1, further comprising:
   determining, at the SD, a CNID of one of the plurality of nodes that has access to at least one copy of the information packet, the one of the plurality of nodes comprising a request destination node (RDN);
converting the CNID of the RDN into a corresponding GNID to create an RDN GNID (RDNGNID); and
forwarding a forwarded request (FR) for receipt at the RDN, wherein the FR includes at least a portion of the NR.

6. The method of claim 5, wherein the forwarding comprises:
accessing a routing table;
using the RDNGNID to determine an inter-node route to the RDN within the SMP with the routing table; and
forwarding the FR to the RDN via the determined inter-node route.

7. The method of claim 5, wherein the RDN is the RN.

8. The method of claim 7, further comprising:
receiving, at the RDN, the FR;
using the FR to access the at least one copy of the information packet; and
transferring the at least one copy of the information packet to the RN.

9. The method of claim 8, wherein the using the FR comprises:
retrieving the at least one copy of the information packet from a cache of the RDN.

10. The method of claim 8, wherein the using the FR comprises:
retrieving the at least one copy of the information packet from a physical address in main memory assigned to the RDNGNID.

11. The method of claim 8, wherein the FR includes an information packet destination node (IPDN) GNID, wherein the IPDN comprises one of the plurality of nodes to which the information packet copy is to be sent, and wherein the method further comprises:
accessing a routing table;
using the DNGNID to determine an inter-node route to the IPDN within the SMP with the routing table; and
transmitting the information packet copy to the IP DN via the determined inter-node route.

12. The method of claim 11, wherein the IPDN is the RN.

13. The method of claim 11, wherein the FR includes a completion packet destination node (CPDN) GNID (CPDNGNID), wherein the CPDN comprises one of the plurality of nodes to which a completion packet evidencing sending of the information packet copy to the IPDN, and wherein the method further comprises:
accessing the routing table;
using the CPDNGNID to determine an inter-node route to the CPDN within the SMP with the routing table; and
transmitting the completion packet to the CP DN via the determined inter-node route.

14. The method of claim 13, wherein the CPDN is the RN.

15. A symmetric multiprocessing system, comprising:
a plurality of processing nodes interconnected to each other by an inter-node communication fabric, wherein each processing node comprises at least one cache, wherein each processing node comprises a geographic node ID (GNID) representing a location within the symmetric multiprocessing system of the processing node among both configured and deconfigured ones of the plurality of processing nodes, and wherein each configured processing node comprises a continuous node ID (CN ID) representing a relation of the configured processing node relative to all of the configured processing nodes in the symmetric multiprocessing system;
a system directory located within at least one of the processing nodes, wherein the system directory utilizes the CNIDs of the processing nodes to determine one or more processing nodes within the symmetric multiprocessing system having access to copies of particular information packets usable by the processing nodes; and
a mapping module that converts processing node GNIDs into corresponding CNIDs for use by the system directory.

16. The symmetric multiprocessing system of claim 15, further comprising:
a routing table that determines, using processing node GNIDs, an inter-node route to the one or more processing nodes having access to copies of the particular information packets, wherein the mapping module converts the processing node CNIDs into GNIDs for use by the routing table.

17. The symmetric multiprocessing system of claim 15, further comprising:
a main memory interconnected to the plurality of configured nodes by the inter-node communication fabric, wherein each processing node is assigned a respective address range in the main memory, wherein each respective address range is associated with the GNID of the processing node.

18. The symmetric multiprocessing system of claim 17, wherein each processing node comprises a memory interface unit that utilizes its corresponding GNID to access its respective address range in the main memory.

19. A method of requesting cache lines in a symmetric multiprocessor (SMP) having a plurality of nodes, comprising:
receiving, at a first of a plurality of nodes of the SMP, a node request (NR) for a cache line needed for processing in the SMP;
determining, at the first node, a continuous node ID (CNID) of one of the plurality of nodes that has access to at least one copy of the needed cache line, wherein the CNID represents a relative relation of the one of the plurality of nodes relative to other configured nodes of the SMP, and wherein the one of the plurality of nodes comprising a request destination node (RDN);
converting the CNID of the RDN into a corresponding geographic node ID (GNID) to create an RDN GNID (RDNGNID), wherein the RDNGNID represents a geographic location of the RDN among both configured and deconfigured ones of the plurality of nodes within the SMP; and
forwarding a forwarded request (FR) for receipt at the RDN, wherein the FR includes at least a portion of the NR.

20. The method of claim 19, wherein the forwarding comprises:
accessing a routing table;
using the RDNGNID to determine an inter-node route to the RDN within the SMP with the routing table; and
forwarding the FR to the RDN via the determined inter-node route.

* * * * *

UNITED STATES PATENT AND TRADEMARK OFFICE
CERTIFICATE OF CORRECTION

PATENT NO. : 8,848,576 B2
APPLICATION NO. : 13/559292
DATED : September 30, 2014
INVENTOR(S) : Chang et al.

Page 1 of 1

It is certified that error appears in the above-identified patent and that said Letters Patent is hereby corrected as shown below:

In the Claims

In column 17, line 39, in Claim 11, delete "IP DN" and insert -- IPDN --, therefor.

In column 17, line 51, in Claim 13, delete "CP DN" and insert -- CPDN --, therefor.

Signed and Sealed this
Twenty-eighth Day of July, 2015

Michelle K. Lee
*Director of the United States Patent and Trademark Office*